(12) United States Patent
Lakshminath et al.

(10) Patent No.: US 9,158,768 B2
(45) Date of Patent: Oct. 13, 2015

(54) SYSTEM AND METHODS TO CONFIGURE A QUERY LANGUAGE USING AN OPERATOR DICTIONARY

(71) Applicants: Anand Lakshminath, Fremont, CA (US); Richard D Henderson, San Jose, CA (US); Davide Libenzi, San Jose, CA (US); Guanglei Song, San Jose, CA (US); Prasad Sriram, Manchester, CT (US); Nicholas Whyte, San Jose, CA (US); Raffi Tutundjian, San Francisco, CA (US)

(72) Inventors: Anand Lakshminath, Fremont, CA (US); Richard D Henderson, San Jose, CA (US); Davide Libenzi, San Jose, CA (US); Guanglei Song, San Jose, CA (US); Prasad Sriram, Manchester, CT (US); Nicholas Whyte, San Jose, CA (US); Raffi Tutundjian, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 118 days.

(21) Appl. No.: 13/759,786

(22) Filed: Feb. 5, 2013

(65) Prior Publication Data

US 2014/0222856 A1 Aug. 7, 2014

Related U.S. Application Data

(60) Provisional application No. 61/675,793, filed on Jul. 25, 2012.

(51) Int. Cl.
*G06F 17/30* (2006.01)
*G06F 21/62* (2013.01)

(52) U.S. Cl.
CPC .... *G06F 17/30011* (2013.01); *G06F 17/30035* (2013.01); *G06F 21/6227* (2013.01)

(58) Field of Classification Search
CPC .................. G06F 17/30035; G06F 21/6227
USPC .................................... 707/769, 784
See application file for complete search history.

(56) References Cited

U.S. PATENT DOCUMENTS

| | | | |
|---|---|---|---|
| RE32,773 E | 10/1988 | Goldwasser et al. | |
| 5,347,653 A | 9/1994 | Flynn et al. | |
| 5,576,734 A | 11/1996 | Daniele et al. | |
| 6,009,425 A | 12/1999 | Mohan | |
| 6,502,233 B1 * | 12/2002 | Vaidyanathan et al. | 717/101 |
| 7,376,642 B2 | 5/2008 | Nayak et al. | |
| 7,647,580 B2 * | 1/2010 | Meijer et al. | 717/114 |
| 7,925,676 B2 | 4/2011 | Hogue et al. | |
| 8,051,385 B1 | 11/2011 | Yawitz et al. | |

(Continued)

OTHER PUBLICATIONS

Hu, "Personalized Web Search by Using Learned User Profiles in Re-ranking", (May 2008), 1-45.*

(Continued)

*Primary Examiner* — William Spieler
(74) *Attorney, Agent, or Firm* — Schwegman Lundberg & Woessner, P.A.

(57) ABSTRACT

A method and a system to configure a query language using an operator dictionary are provided. Dictionary information that corresponds to a first user is generated. The dictionary information includes a first list of compatible query operators and a description of compatible data types that correspond to each operator in the first list of query operators. A search query to search for document information in a database is received from a first user. The database includes an inverted index. Terms of the search query from the first user are determined to be in accordance with the dictionary information that corresponds to the first user. The search query is applied to the inverted index in the database to identify the document information. The document information is sent to the first user.

20 Claims, 8 Drawing Sheets

(56) References Cited

U.S. PATENT DOCUMENTS

| | | | |
|---|---|---|---|
| 8,214,380 B1 | 7/2012 | Bettinger et al. | |
| 8,392,444 B2 | 3/2013 | Shwartz et al. | |
| 8,601,474 B2 | 12/2013 | Konik et al. | |
| 8,655,869 B2 | 2/2014 | Ferrari et al. | |
| 2002/0065802 A1 | 5/2002 | Uchiyama | |
| 2004/0199899 A1 | 10/2004 | Powers et al. | |
| 2005/0015381 A1 | 1/2005 | Clifford et al. | |
| 2005/0071328 A1 | 3/2005 | Lawrence | |
| 2005/0240580 A1 | 10/2005 | Zamir et al. | |
| 2005/0283473 A1 | 12/2005 | Rousso et al. | |
| 2007/0130126 A1 | 6/2007 | Lucovsky et al. | |
| 2007/0198500 A1 | 8/2007 | Lucovsky et al. | |
| 2007/0288490 A1 | 12/2007 | Longshaw | |
| 2008/0104574 A1* | 5/2008 | Mak et al. | 717/120 |
| 2008/0183735 A1 | 7/2008 | Bruckner et al. | |
| 2008/0208844 A1 | 8/2008 | Jenkins | |
| 2009/0063422 A1 | 3/2009 | Kodama | |
| 2009/0327228 A1 | 12/2009 | Krause et al. | |
| 2009/0327314 A1 | 12/2009 | Kim et al. | |
| 2010/0228715 A1 | 9/2010 | Lawrence | |
| 2010/0250578 A1 | 9/2010 | Athsani et al. | |
| 2010/0269090 A1* | 10/2010 | Le Merrer | 717/105 |
| 2010/0306229 A1 | 12/2010 | Timm et al. | |
| 2010/0312724 A1 | 12/2010 | Pinckney et al. | |
| 2011/0055241 A1 | 3/2011 | Lewis | |
| 2011/0218986 A1 | 9/2011 | O'hanlon | |
| 2012/0016875 A1 | 1/2012 | Jin et al. | |
| 2012/0130706 A1 | 5/2012 | Qiu et al. | |
| 2013/0124514 A1 | 5/2013 | Datta et al. | |
| 2014/0032517 A1 | 1/2014 | Henderson et al. | |
| 2014/0032532 A1 | 1/2014 | Song et al. | |
| 2014/0032566 A1 | 1/2014 | Agarwal et al. | |
| 2014/0032593 A1 | 1/2014 | Libenzi et al. | |

OTHER PUBLICATIONS

"U.S. Appl. No. 13/711,287, Examiner Interview Summary mailed Feb. 5, 2015", 3 pgs.

"U.S. Appl. No. 13/711,287, Examiner Interview Summary mailed Jul. 28, 2014", 3 pgs.

"U.S. Appl. No. 13/711,287, Examiner Interview Summary mailed Oct. 2, 2014", 3 pgs.

"U.S. Appl. No. 13/711,287, Final Office Action mailed Dec. 8, 2014", 12 pgs.

"U.S. Appl. No. 13/711,287, Non Final Office Action mailed Apr. 24, 2014", 12 pgs.

"U.S. Appl. No. 13/711,287, Non Final Office Action mailed Aug. 20, 2014", 12 pgs.

"U.S. Appl. No. 13/711,287, Notice of Allowance mailed Mar. 11, 2015", 7 pgs.

"U.S. Appl. No. 13/711,287, Response filed Feb. 19, 2015 to Final Office Action mailed Dec. 8, 2014", 13 pgs.

"U.S. Appl. No. 13/711,287, Response filed Jul. 24, 2014 to Non Final Office Action mailed Apr. 24, 2014", 12 pgs.

"U.S. Appl. No. 13/711,287, Response filed Oct. 20, 2014 to Non Final Office Action mailed Aug. 20, 2014", 12 pgs.

"U.S. Appl. No. 13/730,536, Non Final Office Action mailed Dec. 4, 2014", 26 pgs.

"U.S. Appl. No. 13/730,536, Response filed Mar. 4, 2015 to Non Final Office Action mailed Dec. 4, 2014", 13 pgs.

"U.S. Appl. No. 13/730,583, Examiner Interview Summary mailed Feb. 3, 2015", 3 pgs.

"U.S. Appl. No. 13/730,583, Non Final Office Action mailed Sep. 22, 2014", 17 pgs.

"U.S. Appl. No. 13/730,583, Response filed Feb. 20, 2015 to Non Final Office Action mailed Sep. 22, 2014", 12 pgs.

"U.S. Appl. No. 13/854,801, Non Final Office Action mailed Apr. 22, 2015", 11 pgs.

* cited by examiner

```
Query Operator Dictionary
Abstract
This document is intend to define a metal format to define Cassini query operators  By
using this format, we can create an operator dictionary which can be recognized and agreed
across different functional components in Cassini architecture. By specifying the detailed
signature and attribute of each operator, we can easily create the run time checking of the
legitimate usage of the operators in the query expression.

Meta Format
We will try to use JSON to represent the operator syntax.  And the following is the BNF
definition of how we can write the operators.

operator-dictionary = '{'operator-list'}'
operator-list = operator ',' operator-list
              | operator
operator = name':''{'attributes','return','operands',[named-operands'} ['variable-operands-flag']}'
name = string
attributes = 'attributes' ':' attribute-list
attribute-list = '[' attribute-name ',' attribute-list ']'
               | '[' attribute-name ']'
attribute-name = 'return-position' | 'aggregate-function' | 'is-nullable'|'is-required'
value-type = 'bool' | 'int32' | 'uint32' | 'int64' | 'string' | 'float' | 'any'
return = 'return-type' ':' value_type
operands = 'operands' ':' operand-list
operand-list = '[' operand ',' operand-list ']'
             | '[' operand ']'
named-operands = 'named-operands' ':' named-operand-list
named-operand-list = '[' named-operand ',' named-operand-list ']'
                   | '[' named-operand ']'
operand = '{' data-type ',' required-attributes '}'
named-operand = '{'operand-name',' data-type ',' required-attributes ', ['default-value']}'
operan-name='name' ':'name
data-type = 'data-type' ':' value_type
required-attributes = attributes
variable-operands-flag = 'variable-repeat-last-operand' ':' ['true' | 'false']
default-value = 'default-value' ':' default-str
default-str = string
```

```
{
  "version":
  {
   "major-version": 1,
   "minor-version": 1
  },
  "operators" :
  {
   "dummy_with_pos":
   {
     "attributes" : [],
     "return-type" : "int64",
     "operands" :
     [
      {
       "attributes" : [],
       "data-type" : "int64"
      }
     ],
     "named-operands" :
     [
      {
       "name" : "name1_required",
       "data-type" : "int64",
       "attributes": ["is-nullable", "is-required"]
      },
      {
       "name" : "name2",
       "data-type" : "float",
       "attributes": ["is-nullable"]
      },
      {
       "name" : "name_has_default",
        "data-type" : "float",
        "attributes": ["is-nullable"],
        "default-value" : "3.3"
       }
     ]
    }
   }
 }
```

SYSTEM AND METHODS TO CONFIGURE A QUERY LANGUAGE USING AN OPERATOR DICTIONARY

RELATED APPLICATIONS

This application claims the priority benefit of U.S. Provisional Application No. 61/675,793, filed Jul. 25, 2012, which is incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of data processing and, in one specific example, to configure a query language based on a set of rules tier a user.

BACKGROUND

A user may form a search query using a query language to search for information stored within a database. The query may comprise of operators and operands and a server may process the query and retrieve information based on the operators and operands. Once information is retrieved, it may be presented to the user.

BRIEF DESCRIPTION OF THE DRAWINGS

Some embodiments are illustrated by way of example and not limitation in the figures of the accompanying drawings in which:

FIG. 6 is a diagram depicting a definition used to define an operator dictionary, according to various embodiments;

DETAILED DESCRIPTION

Example methods and systems to configure a query language using an operator dictionary are described. In the following description, for purposes of explanation, numerous specific details are set forth in order to provide a thorough understanding of example embodiments. It will be evident, however, to one skilled in the art that the present invention may be practiced without these specific details.

A search query and other forms of input (e.g., sets of text strings, sequences of expressions, collections of verbal and numeric expressions, etc.) may be received as input. For example a search query may be used to query a database using a query language. In various embodiments, terms of the query language comprise of operators and operands. The operands may serve as inputs for the operators. In various embodiments, terms of the query language may be defined by information described in an operator dictionary. The operator dictionary may include a list of compatible operators that may be used in a search query. In various embodiments, operators not listed in the operator dictionary are incompatible and are not processed by a query processer. The operator dictionary may also describe a list of compatible data types for each operator in the list of compatible operators.

In various embodiments, the operator dictionary may correspond to a first user or first group of users. Different customers (e.g., users) may independently provide rules using their own operator dictionary file. As such, rules regarding compatible operators and compatible data types described in the operator dictionary may apply to the first user or first group of users. In various embodiments, there may be other users or group of users forming search queries to query the database. To accommodate the other users, the configure query language system may have more than one operator dictionary for the other user or groups of users forming search queries. All operator dictionary files are, nevertheless, processed by a single query engine that enforces the rules defined in the respective operator dictionaries.

Figure 1:
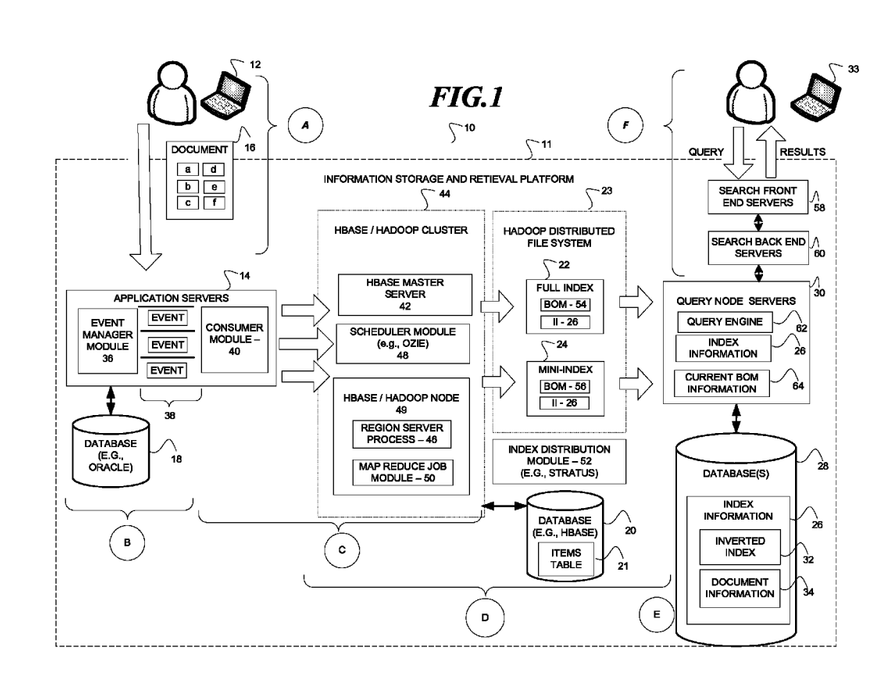
FIG. 1 is a network diagram depicting a client-server system, where various embodiments may be implemented.

FIG. 1 illustrates a system 10 to build and utilize a search infrastructure, according to an embodiment. The system 10 may include an information storage and retrieval platform 11 that is communicatively coupled over a network (e.g., Internet) (not shown) to a client machine 12 and a client machine 33.

Illustrated on the top left is an operation A that describes a first user operating the client machine 12 to interact with an application server 14 to store or update a document 16 in a database 18; illustrated in the middle are operations 8, C, D, E that describe retrieving and transforming the contents of the database 18, storing the transformed contents in a database 20 that is time-stamped, retrieving the contents from the database 20 to generate a full-index 22 and a set of mini-indexes 24 which are utilized to generate and continually update the index information 26 in the database 28 to be consumed and served by the query node servers 30; and illustrated on the top right is an operation F that describes a second user who operates a client machine 33 to enter a query that is received by one or more query node servers 30 that, in turn, apply the query to the index information 26 to identify and return search results that reference the document 16. The above operations to continually rebuild the index information 26 are performed in real-time and without interruption to service that is provided to the first and second users who continue to interact with the system 10.

The index information 26 may include an inverted index 32 and document information 34. An inverted index (e.g., inverted index 32), as is well known in the art, is an index data structure storing a mapping from content (e.g., content contained by the document 16), such as words or numbers, to its locations in a database file, or in a document (e.g., document 16) or a set of documents. The documents 16 (e.g., document data, column group data) and/or information contained by the documents 16 may be stored in the document information 34.

Merely for example a "document X" may include the words "apple," "orange," and "banana;" a "document Y" may include the words "apple" and "orange; and, a "document Z" may include the word "apple." An inverted index for the words in documents X, Y, and Z may be generated as follows:

| Word | Document |
|---|---|
| apple | X(1), Y(1), Z(1) |
| orange | X(2), Y(2) |
| banana | X(3) |

The above inverted index may be utilized to identify the word "apple" as being positioned in the first word of documents X, Y, and Z; the word "orange" as being positioned in the second word of the documents X and Y; and the word "banana" as being positioned as the third word of the document X. Accordingly, the above inverted index may be utilized to map a keyword "apple" contained in a query that is received from a client computer to the documents X, Y, and Z that are further referenced in search results that are returned to the client computer. It is appreciated by one skilled in the art that the inverted index 32 corresponds to the underlying database that it describes. Accordingly, any update to the underlying database is reflected in a corresponding update to the inverted index 32. Updates to the database 28 may include the addition and deletion of documents 16 in the document information 34 as well as the update of any of the contents contained by the documents 16 in the document information 34. In the present embodiment, the index information 26 may be updated in real time to respond to a query in real time with accurate search results that include the most recent document information 34. To this end, the operations A-F are now further described.

The information storage and retrieval platform 11 includes multiple components including the application servers 14 that may execute on one or more application server machines (not shown), the database 18, a database 20, an Hadoop distributed file system 23, the database 28, the query node servers 30 that operate on query node server machines (not shown), an Hbase/Hadoop Cluster 44 comprised of one or more Hbase/Hadoop machines (not shown) including an Hbase Hadoop Node 49 (e.g, Hbase/Hadoop machine), an index distribution module 52 executing on Hbase/Hadoop machine, search front end servers 58 that executes on search machines not shown), and search back end servers 60 that execute on search machines (not shown) as being communicatively coupled together. For example, the multiple components may be communicatively coupled with any combination of a wide area network, local area network, wireless network, or any other type of network utilizing various networking technologies.

At operation A, the document 16, or one or more elements of the document 16, may be communicated from the client machine 12 to the application servers 14 and stored in the database 18 (e.g., Oracle database). The document 16 may include multiple elements including elements b, c, d, e, and f that may include strings of text, numeric information, scores, or other discrete quantum of information that are positioned in different sections or fields of the document (e.g., item information).

At operation B, at the application servers 14, event manager modules 36 may identify updates to the database 18, generate events that correspond to the respective updates, prioritize the events according to the quality of the data in the event and communicate the prioritized events into event queues 38 that are consumed by consumer modules 40 that service the respective event queues 38. According to an embodiment, the event manager modules 36 and the consumer modules 40 may utilize three event queues 38 to process and prioritize event types. For example, the update of the "element a" in the document 16 in the database 18 may be a price change to item information describing an item for sale that causes the generation of a corresponding event that is associated with a high priority that, in turn, is communicated into in a first event queue associated with high priority that, in turn, is received by a consumer module 40. Similarly, the update of the "element b" in document 16 in the database 18 may be a change to a title of the item that causes the generation of an event that is associated with a medium priority that, in turn, is communicated into a second event queue associated with the medium priority that, in turn, is received by a consumer module 40. Finally, the update of the "element c" in document 16 in the database 18 may be a change to a description of the item that causes the generation of an event that is communicated into a third event queue associated with a low priority that, in turn, is received by a consumer module 40. Accordingly, the three event queues 38 may be utilized to communicate events in high, medium, and low priorities to facilitate a preference for the update of high priority events (e.g., price) over medium priority events (e.g., title) over low priority events (e.g., description). In some embodiments the priority for the respective event types may be configured. Other embodiments may include fewer or more event queues 38.

At operation C, the consumer modules 40 may transform the data in the events and communicate the transformed data via an HBase application programming interface to an HBase master server 42 in an HBase/Hadoop cluster 44 that, in turn, stores the transformed data in one or more tables including an items table 21 in the database 20 (e.g., HBase). The transformed data may be stored according to regions that are managed by region server processes 46. According to embodiment, the database 20 may be embodied as an open source non-relational, distributed database (e.g., HBase) that runs on a Hadoop Distributed Filesystem (HDFS) 23. HDFS 23 is an open source software framework that supports data-intensive distributed applications, known by those skilled in the art. The Hbase/Hadoop cluster 44 may further includes the HBase master server 42 that is utilized to manage the HBase/HDFS environment, a scheduler module 48, and an HBase/Hadoop node 49 that includes multiple region server processes 46 and a map-reduce job module 50. Each region server process 46 may further be associated with a column (not shown) that corresponds to a range of documents (e.g., or items corresponding to item information in the items table 21) and may be utilized to manage one or more regions (not shown) that respectively correspond to a range of the documents 16. For example, the documents 16 may be uniquely identified with document identifiers e.g., item identifiers) that are numbered from 0 to X where each column and region are dedicated to respective overlapping predetermined ranges of documents (e.g., documents (0-100 and documents (0-50), as described further in this document. According to one embodiment, the number of region server processes 46 may be in the hundreds but scaling is not limited to any fixed number. HBase is a technology that provides a fault-tolerant way of storing large quantities of sparse data featuring compression, in-memory operation, and a space-efficient probabilistic data structure e.g., Bloom filters) on a per-column basis as outlined in the original BigTable paper, as is known by those skilled in the art. A table in the database 20 (e.g., HBase) may serve as the input and output for one or more map-reduce jobs that are scheduled by the map-reduce job module 50. The map-reduce jobs may be embodied as a map jobs and reduce jobs that runs in HDFS. The tables in the database 20 may further be accessed through the Java Application Programming Interface (API) but also through representational state transfer (REST) architecture and other APIs.

At operation D, the scheduler module 48, executing in the HBase/Hadoop cluster 44, may schedule two index generating sub-operations that process in parallel to generate indexes that are subsequently distributed to the query node servers 30. The sub-operations may execute for the generating of a full-index 22 and the generating of the mini-indexes 24. The sub-operations may further execute for the distribution of the indexes to the query node servers 30. The full-index 22 may be a snapshot of the contents of items table 21 in the database 20 and the mini-indexes 24 may respectively correspond to a series of consecutive snapshots where each snapshot captures one or more updates to the items table 21 in the database 20 that occurred within an associated time period of time. The distribution of the full-indexes 22 and the mini-indexes 24 to the query node servers 30 may be over a network utilizing an index distribution module 52 which is based on Bit Torrent, a peer to peer file sharing protocol in one embodiment, the scheduler module 48 may schedule the generation of the full-index 22 twice in a twenty-four hour period and the generation of mini-indexes 24 every five minutes. The scheduler module 48 may generate a full-index 22 that is associated with a start-time by scheduling a map-reduce job module 50. The map-reduce job module 50 may initiate a map step that divides the job into smaller sub-jobs (e.g., map tasks) and multiple reduce steps that consume the output from the sub-jobs and aggregates results to generate the index information 26. Similarly, the scheduler module 48 may generate a mini-index 24 by scheduling a map-reduce job module 50 for execution on the Hbase/Hadoop Node 49 may include a map step but not, according to one embodiment, a reduce step. Accordingly, each mini-index 24 may be associated with events that arrive from the event queues 38 during a particular period of time and is associated with one or more full-indexes 22. Each index 22, 24 (e.g., full and mini) may include a bill of material (BOM) information which describes the content of the index 22, 24 including the index information 26. The full-index 22 may include full-index BOM information 54 and the mini-index 24 may include mini-index BOM information 56. The index information 26 may include the inverted index 32 and document information 34, as previously described.

At operation F, each of the query node servers 30 may receive the full-index 22 and the associated mini-indexes 24. The query node servers 30 may be comprised of a search grid that is arranged in columns of query node servers 30, as described later in this document. Each column of query node serves 30 and may be utilized to manage a range of the documents 16 (e.g., column), as previously mentioned. The index information 26 may be stored in memory of the query node servers 30 and in the database 28 connected to the query node servers 30. The index information 26 may be updated with the full-index 22 responsive to its arrival at the query node servers 30. Further, the index information 26 may be updated with the mini-index 24 responsive to its arrival at the query node servers 30. The index information 26 is generally updated in sequential order. For example, the index information 26 are generally updated at the query node server 30 in the order in which the full-index 22 and the mini-indexes 24 are generated. To this end, the full-index 22 may be associated with full-index BOM information 54 the mini-index 24 may be associated with mini-index BOM information 56 that are utilized by the query node server 30 to manage the update of the index information 26. In one embodiment a map-reduce job module 50 may include sub-jobs that execute on the Hbase/Hadoop node 49 to generate inverted indices in the form of region sub-indices (not shown) for part of the region associated with the region server (HBase). The sub-jobs may further merge or stitch the multiple region sub-indices together for the region.

At operation F, a second user who operates the client machine 33 may enter a query that may be communicated over a network (e.g., Internet) via front-end servers 58 and back-end servers 60 to be received by the query node servers 30 which may be divided into two layers. The two layers may include an aggregation layer and a query execution layer. The aggregation layer may include a query node server 30 that includes a query engine 62 (e.g., query module) that receives the query that, in turn, communicates the query to multiple query engines 62 that respectively execute in the execution layer in multiple query node servers 30 that correspond to the columns. The query engines 62 in the query execution layer may, in turn, respectively apply the same query, in parallel, against respective the index information 26 that were generated for a range of document identifiers (e.g., column) to identify search results (e.g., document 16) in parallel. Finally, the query engines 62, at each query node servers 30 in the query execution layer, may communicate their respective partial search results to the query engine 62 in the aggregation layer which aggregates the multiple sets of partial search results to form a search result for the entire index information 26 and to communicate the search result over the network to the second user.

Figure 2:
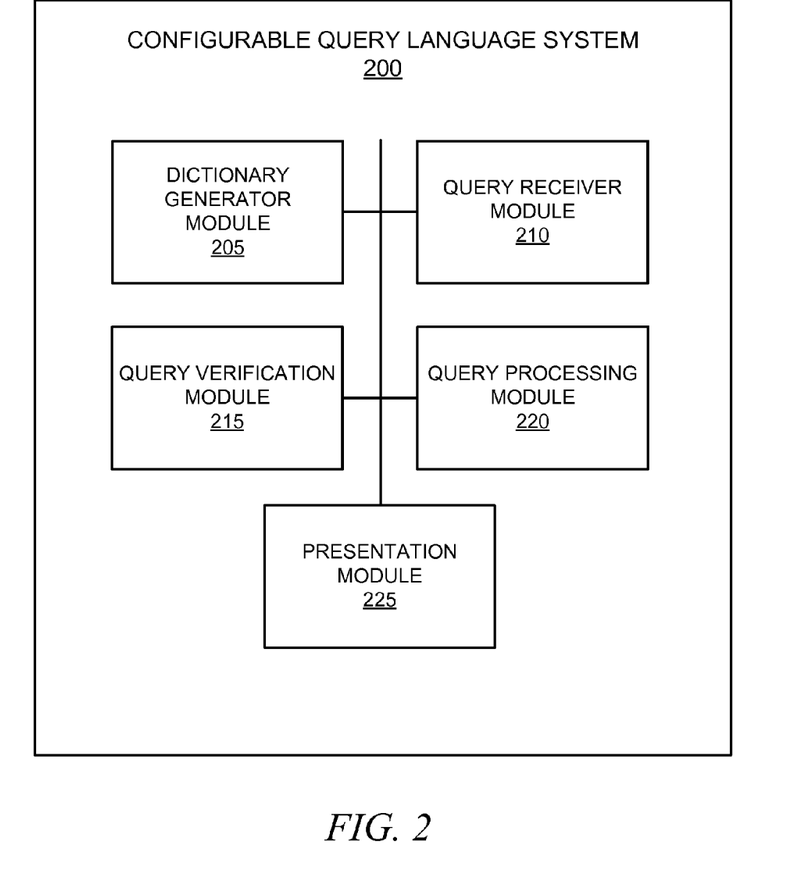
FIG. 2 is a block diagram of a configurable query language system, according to various embodiments.

FIG. 2 is a block diagram of a configurable query language system 200, according to various embodiments. The system 200 may be implemented as hardware or as software executed by hardware (e.g., by one or more processors) comprises a dictionary generator module 205, a query receiver module 210, a query verification module 215, a query processing module 220, and a presentation module 225.

In various embodiments, the dictionary generator module 205 may be configured to generate an operator dictionary corresponding to a user or group of users. The information described in the operator dictionary may describe the terms of a query language that may be used in a search query. For instance, the operator dictionary may describe a list of compatible operators. An operator that is listed as a compatible operator may be processed by the query processing module 220 for the user of group of users. In various embodiments, if the corresponding user or group of users forms a query using an operator not listed in the operator dictionary, then the system 200 may not process the query. Each operator described in the operator dictionary may perform an operation on input data, also known as an operand. In various embodiments, an operator may operate on at least one operand. Operands may also be of various data types. In some instances, an operand may be an integer, a string, a double, and the like. An operator may perform an operation using operands of various data types. For example, the operator "AND" may perform an operation using an operand of the string data type and an operand of the integer data type. Moreover, the result of an operation performed by an operator may also be of various data types. The operator dictionary may describe a list of compatible data types to be used in connection with each operator in the operator dictionary. The list of compatible data types may describe compatible input data types for an operator. The list of compatible data types may also describe output data types for an operator.

In various embodiments, the query verification module 215 may be configured to determine that the terms of the search query are in accordance with the operator dictionary. The query verification module 215 may determine that an operator in the search query is listed as a compatible operator in the operator dictionary. A compatible operator may be processed by the query processing module 220. Alternatively, the query verification module 215 may determine operator in the search query is not listed as a compatible operator in the operator dictionary and not processed by the query processing module 220. The query verification module 215 may also determine that an input to an operator in the search query is of a compatible data type for the operator, as described in the list of compatible data types. The query verification module 215 may also determine that an output from an operator is of a compatible data type for the operator, as described in the list of compatible data types. In various embodiments, a search query is determined to be in accordance with the operator dictionary: if all of its operators are listed as a compatible operator in the operator dictionary and if all of the input data types and output data types for each operator are described as a compatible data type.

In various embodiments, the query may be represented as an expression tree of nodes that are connected to one another. Each node in the expression tree may include an operator or an operand. The nodes may also be arranged according to a parent-child hierarchy, in which parent nodes are represented at a level higher than child nodes. A parent node may be connected with at least one child node. In various embodiments, data included in the at least one child node may be an input to the operator included in the parent node. The query verification module 215 may verify a search query represented as an expression tree determining that data included in a child node is listed as a compatible data type for an operator included in the parent of the child. Moreover, the query verification module 215 may determine that the operator included in a parent node is listed as a compatible operator the in the operator dictionary. The query verification module 215 may traverse the expression tree until all of the nodes in the expression tree are evaluated. In various embodiments, a search query is determined to be in accordance with the operator dictionary if all of its operators are listed as a compatible operator in the operator dictionary and if all of the input data types and output data types for each operator are described as a compatible data type.

In various embodiments, more than one user or group of users may submit a query to the system 200. As such, the dictionary generator module 205 may generate an additional operator dictionary. The additional operator dictionary may correspond to the other user or group of users. In some instances, the additional operator dictionary may be identical to the first operator dictionary. Alternatively, the additional operator dictionary may be different from the first operator dictionary. In various embodiments, the list of compatible operators from the first operator dictionary may be different from the list of compatible operators from the additional operator dictionary. In various embodiments, the list of compatible data types from the first operator dictionary may be different from the list of compatible data types from the additional operator dictionary. In various embodiments, because the operator dictionaries are different, terms of a search query that conforms to rules listed in the first operator dictionary may be in violation of rules listed in the additional operator dictionary. Moreover, terms of a search query that conforms to the rules listed in the additional operator dictionary may be in violation of the rules listed in the first operator dictionary.

In various embodiments, the query verification module 215 may be configured to determine that the terms of the query from a user or group of users are in accordance with the operator dictionary corresponding to the user or group of users. For instance, a first user may submit a first query with terms that are in accordance with first operator dictionary. Additionally, a second user may submit a second query with terms that are identical to the first query but the second query may not be in accordance with the second operator dictionary corresponding to the second user, even though the first and second queries are identical. In this way, the system 200 may define the query language used by the first user to be different from the query language used by the second user based on the operator dictionary generated by the dictionary generator module 205. Alternatively, the system 200 may define the query language used by the first user to be the same as the query language used by the second user based on the operator dictionary generated by the dictionary generator module 205.

In various embodiments, the query receiver module 210 may be configured to receive a query from a user to search for document information in the database(s) 26 of FIG. 1. The query receiver module 210 may receive queries from a plurality of users and the queries from each user may be different.

In various embodiments, as soon as the query is verified by the query verification module 215, the query processing module 220 may send the query to the query node servers 24 of FIG. 1 in order to be processed.

In various embodiments, the presentation module 225 may be configured to send the retrieved document information 21 of FIG. 1 back to the user that submitted the search query.

Figure 3:
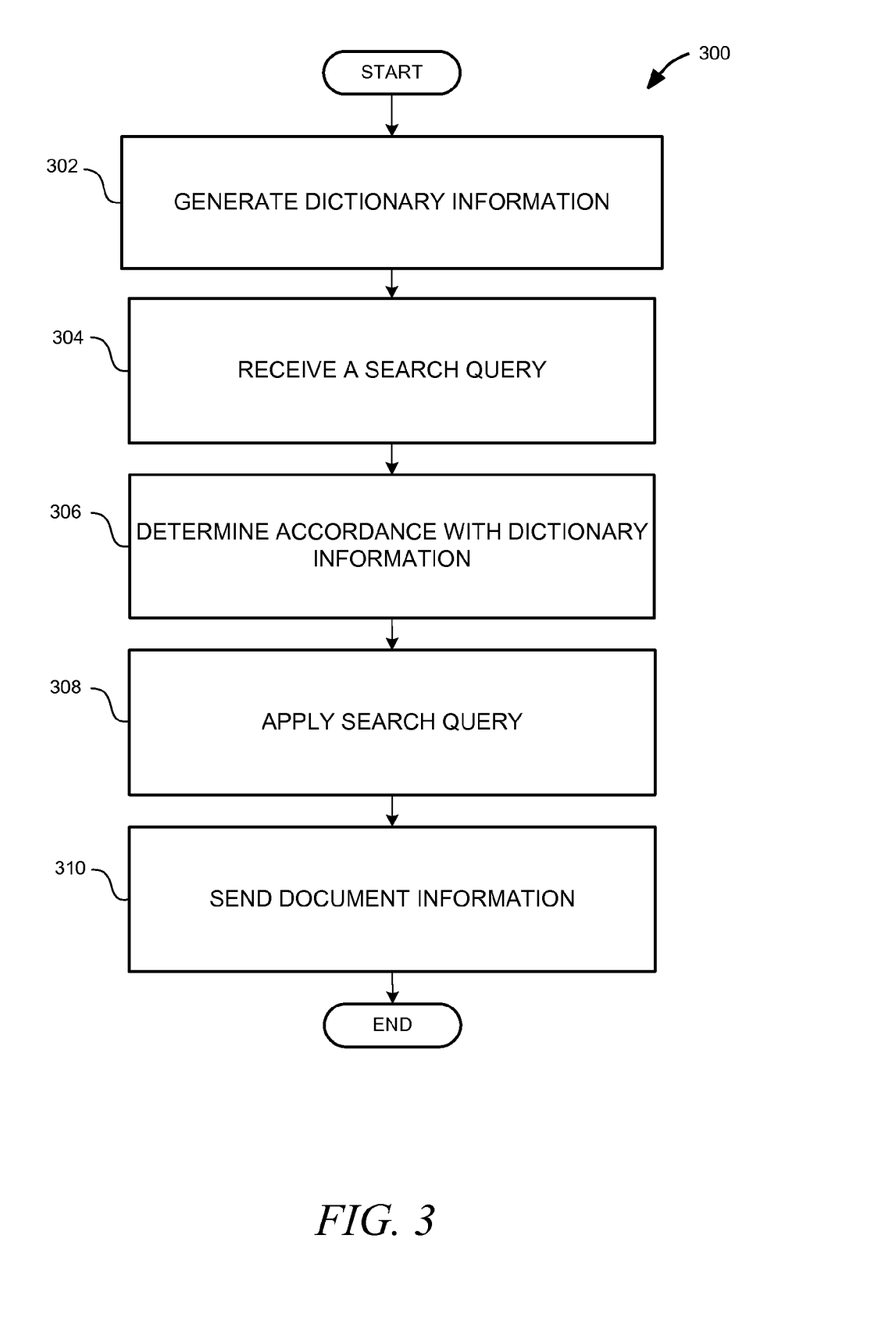
FIG. 3 is a flowchart of a method to generate an operator dictionary and then verify a query using the operator dictionary, according to various embodiments.

FIG. 3 is a flowchart of a method 300 to generate an operator dictionary and then verify a query using the operator dictionary, according to various embodiments. The method begins at step 302 when the dictionary generator module 205 generates dictionary information that corresponds to a first user. In various embodiments, the dictionary information may include a first list of compatible query operators and a description of compatible data types that correspond to each operator in the first list of compatible query operators. At step 304, the query receiver module 210 may receive, from the first user, a search query to search for document information in a database. In various embodiments, the database may include an inverted index. At step 306, the query verification module 215 may determine that terms of the search query from the first user are in accordance with the dictionary information that corresponds to the first user. In various embodiments, the query verification module 215 may determine that an operator in the search query is included in the first list of compatible query operators. In various embodiments, the query verification module 215 may determine that an input to an operator in the search query is described as a compatible data type that is included in the description of compatible data types. In various embodiments, the query verification module 215 may determine that an output of an operation corresponding to an operator in the search query is described as a compatible data type. At step 308, the query processing module 220 may apply the search query to the inverted index in the database to identify the document information. And at step 310, the presentation module 225 may send the document information to the first user.

Figure 4:
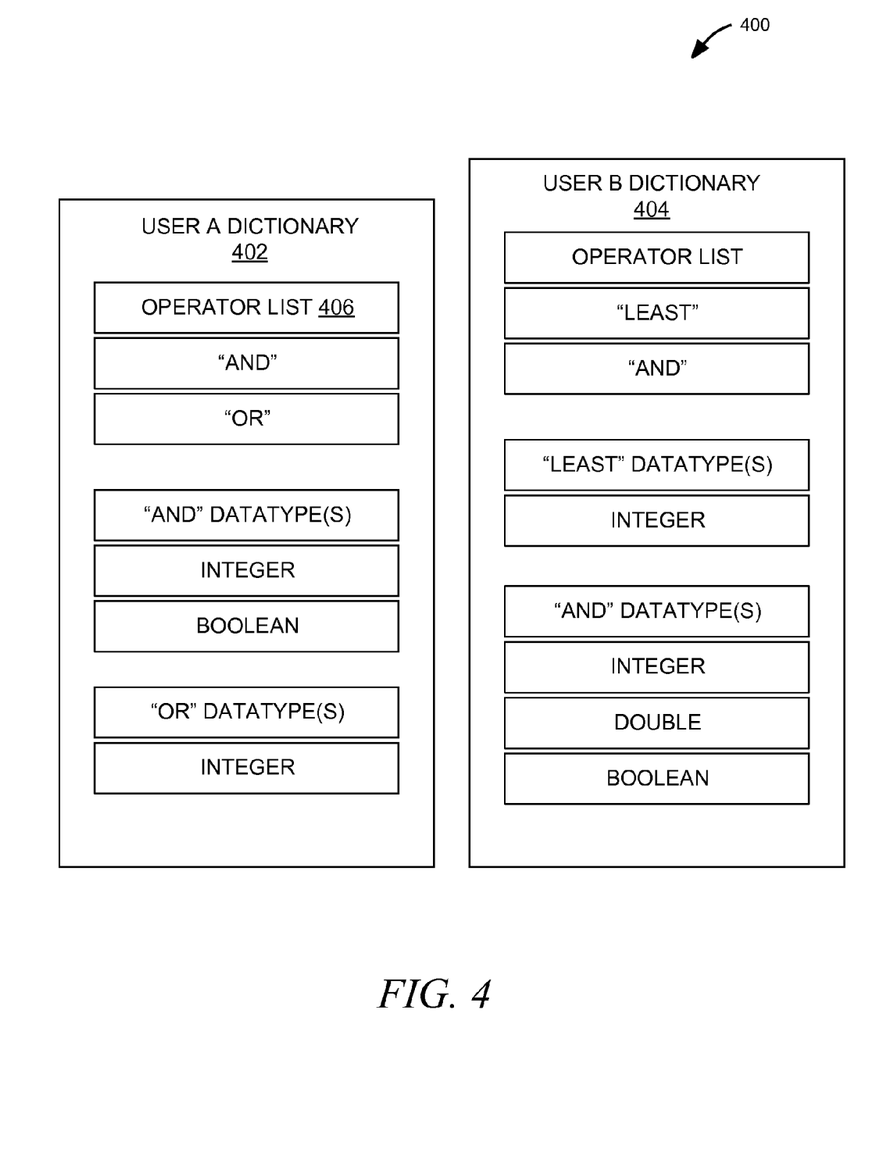
FIG. 4 is a block diagram depicting two operator dictionaries, according to various embodiments.

FIG. 4 is a block diagram 400 depicting two operator dictionaries, according to various embodiments. As mentioned previously, an operator dictionary may correspond to a user or a group of users. In this diagram 400, operator dictionary 402 corresponds to user A and operator dictionary 404 corresponds to user B. In various embodiments, queries formed by user A may be verified using dictionary 402 and queries formed by user B may be verified using dictionary B. In various embodiments, an operator dictionary 402 may include a list of compatible operators 406. In this particular embodiments, the list of compatible operators 406 includes the operators "AND" and "OR." There may also be a list of compatible data types for each operator from the list of compatible operators. FIG. 4 depicts a list of compatible data types 408 for the "AND" operator and a list of compatible data types 410 for the "OR" operator. As depicted in FIG. 4, operator dictionaries may be different from one another. The list of operators from operator dictionary 402 is different from the list operators from operator dictionary 404. In various embodiments, FIG. 4 depicts a visual representation of an operator dictionary. However, this depiction is only one particular embodiment. In various embodiments, the operator dictionary may not be represented in the same manner.

Figure 5:
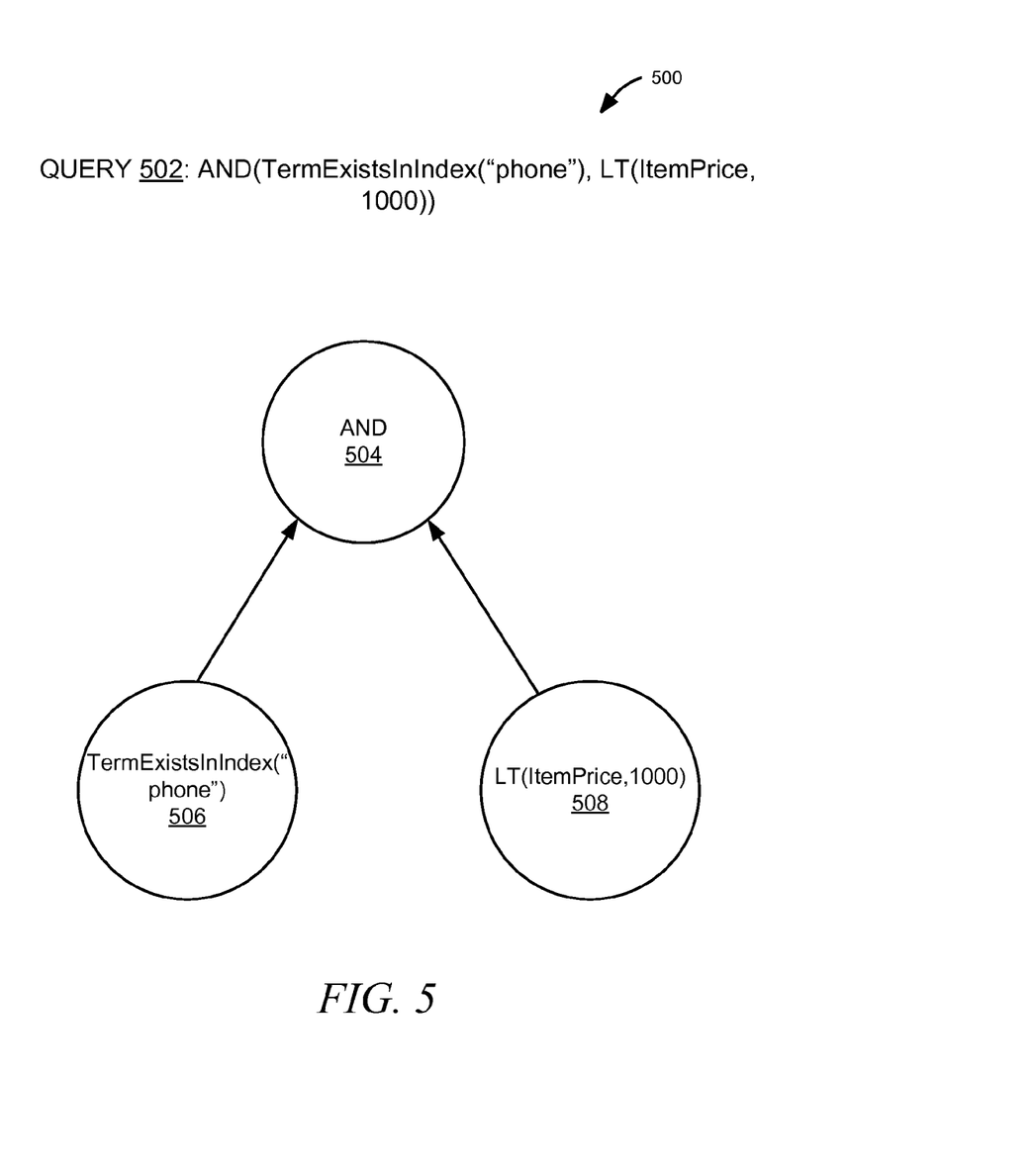
FIG. 5 is a diagram depicting a query represented as an expression tree, according to various embodiments.

FIG. 5 is a diagram 500 depicting a query represented as an expression tree, according to various embodiments. In various embodiments, a query 502 may be represented in the form of a tree 504 where each term of the query 502 is represented as a node of the expression tree 504. As depicted in FIG. 5, the "AND" operator from the query 502 is represented at node 504. The "AND" operator may also operate on two inputs. In FIG. 5, the inputs to the "AND" operator are represented by node 506 and node 508. As mentioned previously, the expression tree 504 may be arranged according to the parent-child hierarchy. In various embodiments, node 506 and node 508 are child nodes of parent node 504.

FIG. 6 is a diagram depicting a definition 600 used to define an operator dictionary, according to various embodiments.

Figure 7:
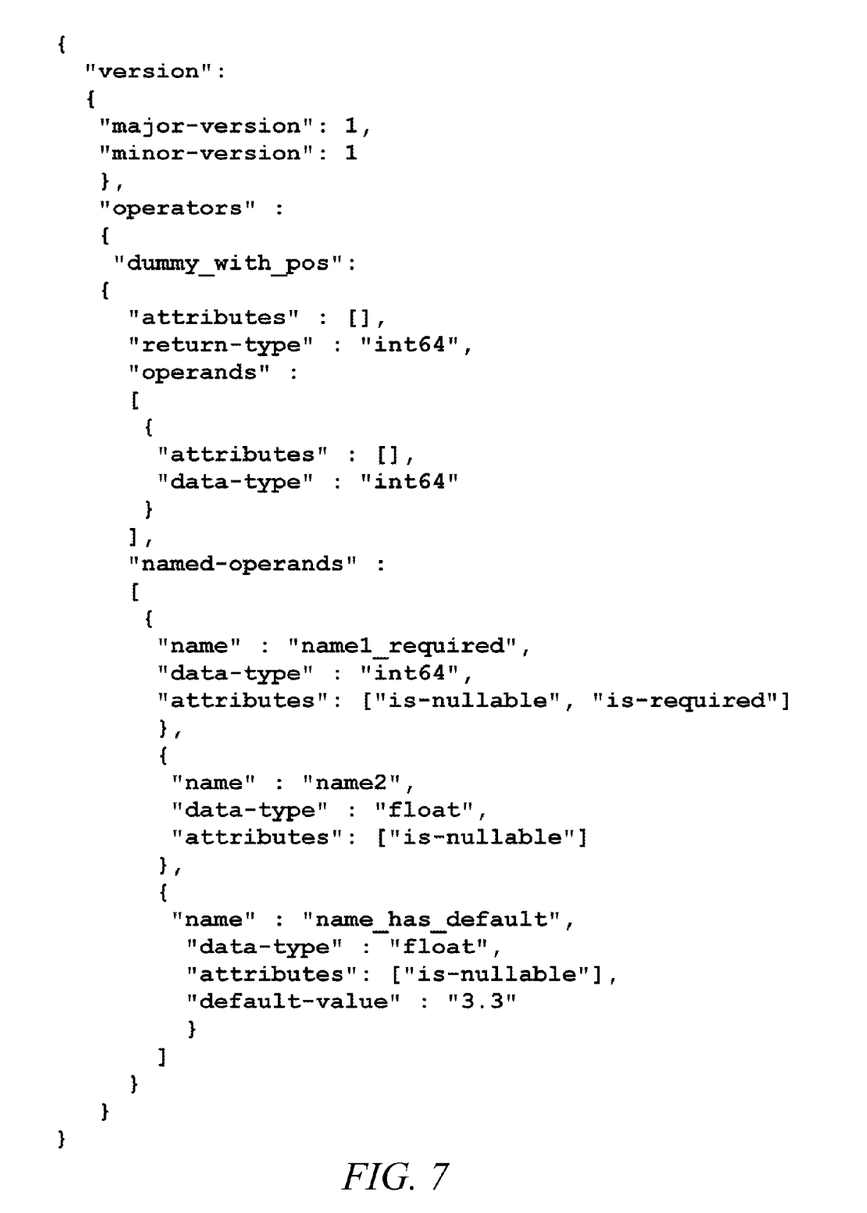
FIG. 7 is a diagram depicting an example operator dictionary using the definition depicted in FIG. 6, according to various embodiments.

FIG. 7 is a diagram depicting an example operator dictionary 700 using the definition depicted in FIG. 6, according to various embodiments.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
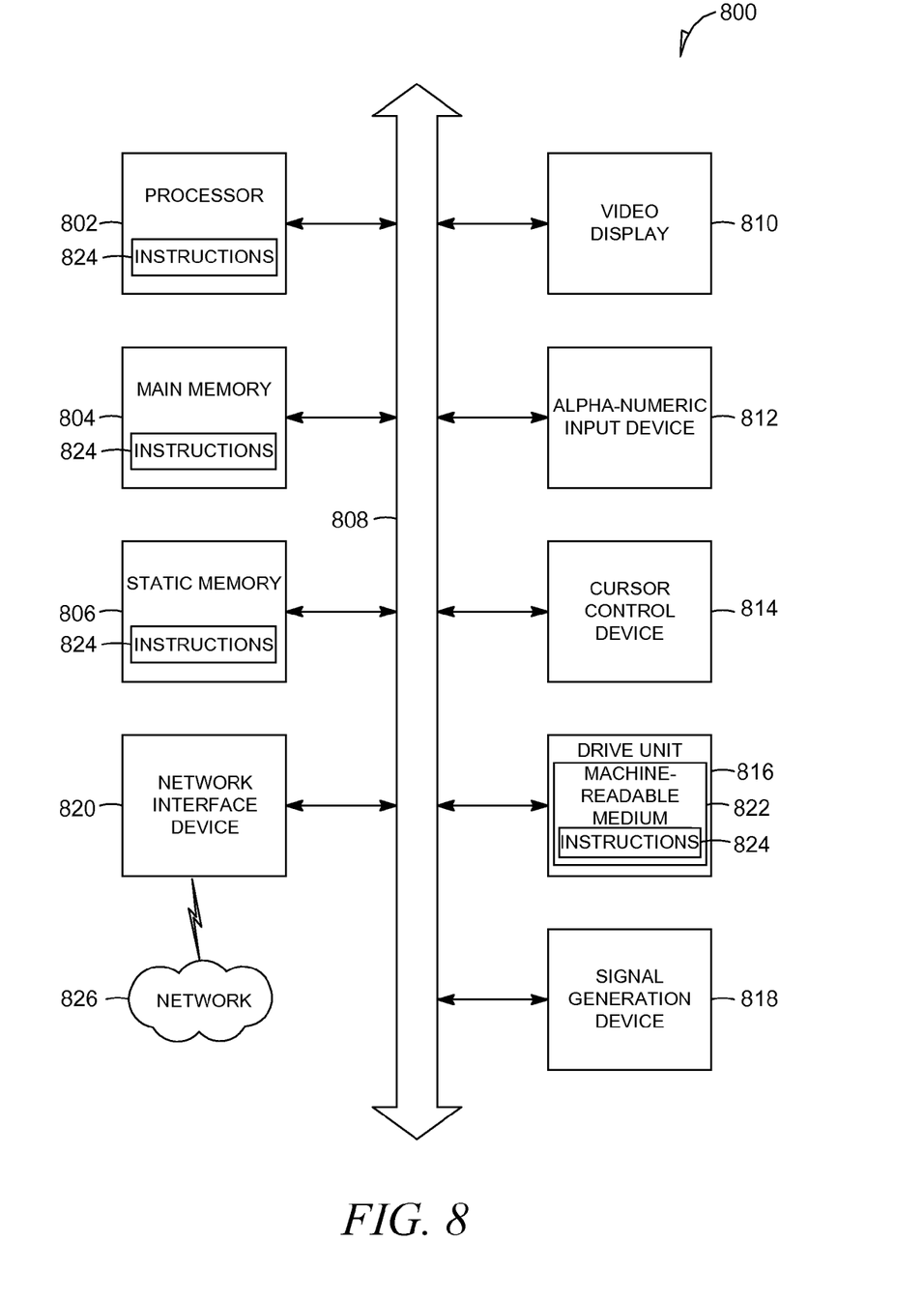
FIG. 8 is a diagram depicting a representation of a machine in the example form of a computer system, according to various embodiments.

FIG. 8 is a diagram depicting a representation of a machine in the example form of a computer system 800, according to various embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors;
   a dictionary generator module, implemented using the one or more processors, configured to generate dictionary information that corresponds to a first user, the dictionary information includes a first list of compatible query operators and a description of compatible data types that correspond to each operator in the first list of compatible query operators;
   a query receiver module, implemented using the one or more processors, configured to receive, from the first user, a search query to search for document information in a database, the database includes an inverted index;
   a query verification module, implemented using the one or more processors, configured to determine that terms of the search query from the first user are in accordance with the dictionary information that corresponds to the first user;
   a query processing module, implemented using the one or more processors, configured to apply the search query to the inverted index in the database to identify the document information; and
   an presentation module, implemented using the one or more processors, configured to send the document information to the first user.

2. The system of claim 1, wherein the dictionary generator module is further configured to:
   generate dictionary information that corresponds to a second user, the dictionary information that corresponds to the second user includes a second list of compatible query operators and a description of compatible data types that correspond to each operator in the second list of compatible query operators, wherein the dictionary information that corresponds to the second user is different from the dictionary information that corresponds to the first user.

3. The system of claim 2, wherein the query receiver module is further configured to:
   receive, from the second user, a search query to search for document information in the database, wherein the search query from the second user is different than the search query from the first user.

4. The system of claim 3, wherein the query verification module is further configured to:
   determine, using one or more processors, that the terms of the search query from the second user are in accordance with the dictionary information corresponding to the second user.

5. The system of claim 2, wherein the query receiver module is further configured to:
   receive, from the second user, a search query to search for document information in the database, wherein the search query from the second user is identical to the search query from the first user.

6. The system of claim 5, wherein the query verification module is further configured to:
   determine, using one or more processors, that the terms of the search query from the second user are not in accordance with the dictionary information corresponding to the second user.

7. The system of claim 1, wherein the query verification module is configured to determine that an operator in the search query is included in the first list of compatible query operators.

8. The system of claim 1, wherein the query verification module is configured to determine that an input to an operator in the search query is described as a compatible data type that is included in the description of compatible data types.

9. The system of claim 1, wherein the query verification module is configured to determine that an output of an operation corresponds to an operator in the search query is described as a compatible data type.

10. The system of claim 1, wherein the search query is arranged as an expression tree that includes at least one child node coupled to at least one parent node and wherein data included in the at least one child node is an input to an operator included in the at least one parent node.

11. The system of claim 10, wherein the query verification module is configured to determine that the data included in the at least one child node is described as a compatible data type to the operator included in the at least one parent node.

12. A method comprising:
    generating dictionary information corresponding to a first user, the dictionary information including a first list of compatible query operators and a description of compatible data types corresponding to each operator in the first list of compatible query operators;
    receiving, from the first user, a search query to search for document information in a database, the database including an inverted index;
    determining that terms of the search query from the first user are in accordance with the dictionary information corresponding to the first user,
    applying the search query to the inverted index in the database to identify the document information; and
    sending the document information to the first user.

13. The method of claim 1, further comprising:
    generating dictionary information corresponding to a second user, the dictionary information corresponding to the second user including a second list of compatible query operators and a description of compatible data types that correspond to each operator in the second list of compatible query operators, wherein the dictionary information corresponding to the second user is different from the dictionary information corresponding to the first user.

14. The method of claim 13, further comprising:
    receiving, from a second user, a search query to search for document information in the database, wherein the search query from the second user is different than the search query from the first user.

15. The method of claim 14, further comprising:
determining that the terms of the search query from the second user are in accordance with the dictionary information corresponding to the second user.

16. The method of claim 13, further comprising:
receiving, from the second user, a search query to search for document information in the database, wherein the search query from the second user is identical to the search query from the first user.

17. The method of claim 16, further comprising:
determining the terms of the search query from the second user are not in accordance with the dictionary information corresponding to the second user.

18. The method of claim 1, wherein the search query is arranged as an expression tree including at least one child node coupled to at least one parent node and wherein data included in the at least one child node is an input to an operator included in the at least one parent node.

19. The method of claim 1, wherein the determining that terms of the search query are in accordance with the dictionary information includes determining that the data included in the at least one child node is described as a compatible data type to the operator included in the at least one parent node.

20. A non-transitory machine-readable medium storing instructions which, when executed by one or more processors, cause the one or more processors to perform operations comprising:
generating dictionary information corresponding to a first user, the dictionary information including a first list of compatible query operators and a description of compatible data types corresponding to each operator in the first list of compatible query operators;
receiving, from the first user, a search query to search for document information in a database, the database including an inverted index;
determining that terms of the search query from the first user are in accordance with the dictionary information corresponding to the first user;
applying the search query to the inverted index in the database to identify the document information; and
sending the document information to the first user.

* * * * *